US009126204B1

(12) United States Patent
Toberman et al.

(10) Patent No.: US 9,126,204 B1
(45) Date of Patent: Sep. 8, 2015

(54) PROCESS AND SYSTEM FOR PRODUCING ENGINEERED FUEL

(71) Applicants: Richard A. Toberman, Galveston, TX (US); Thomas F. Perry, Newnan, GA (US)

(72) Inventors: Richard A. Toberman, Galveston, TX (US); Thomas F. Perry, Newnan, GA (US)

(73) Assignee: WM INTELLECTUAL PROPERTY HOLDINGS L.L.C., Houston, TX (US)

( * ) Notice: Subject to any disclaimer, the term of this patent is extended or adjusted under 35 U.S.C. 154(b) by 0 days.

(21) Appl. No.: 13/832,447

(22) Filed: Mar. 15, 2013

Related U.S. Application Data

(60) Provisional application No. 61/756,417, filed on Jan. 24, 2013.

(51) Int. Cl.
*C10L 5/00* (2006.01)
*B02C 23/08* (2006.01)

(52) U.S. Cl.
CPC ..................................... *B02C 23/08* (2013.01)

(58) Field of Classification Search
CPC ....................................................... B02C 23/08
USPC .............. 44/589; 241/24.13, 24.18, 24.19, 25
See application file for complete search history.

(56) References Cited

U.S. PATENT DOCUMENTS

| | | | |
|---|---|---|---|
| 4,152,119 A | 5/1979 | Schulz | |
| 4,200,486 A | 4/1980 | Vagac et al. | |
| 4,245,999 A * | 1/1981 | Reiniger | 241/41 |
| 4,529,407 A | 7/1985 | Johnston et al. | |
| 4,859,211 A * | 8/1989 | Moore | 44/589 |
| 4,888,852 A | 12/1989 | Varin | |
| 4,935,038 A | 6/1990 | Wolf | |
| 5,104,047 A | 4/1992 | Simmons | |
| 5,342,418 A | 8/1994 | Jesse | |
| 5,413,487 A | 5/1995 | Lundell | |
| 5,429,645 A | 7/1995 | Benson et al. | |
| 5,441,990 A | 8/1995 | Robin et al. | |
| 5,464,760 A | 11/1995 | Tsai et al. | |
| 5,568,996 A | 10/1996 | Buehler | |
| 5,643,342 A | 7/1997 | Andrews | |
| 5,888,256 A | 3/1999 | Morrison | |
| 5,980,595 A | 11/1999 | Andrews | |
| 6,000,639 A | 12/1999 | Ganguli | |
| 6,113,662 A | 9/2000 | Sprules | |
| 6,270,655 B1 | 8/2001 | Ganguli | |

(Continued)

FOREIGN PATENT DOCUMENTS

| | | |
|---|---|---|
| WO | 2009158539 A1 | 12/2009 |
| WO | 2009158540 A1 | 12/2009 |

(Continued)

OTHER PUBLICATIONS

Kela Energy, LLC; KeLa Engineered Fuels; Mar. 2008; KeLa Energy, LLC; U.S.; Powerpoint; 21 pages.

(Continued)

*Primary Examiner* — Cephia D Toomer
(74) *Attorney, Agent, or Firm* — Greenberg Traurig, LLP

(57) ABSTRACT

A process and system for producing an engineered fuel product that meets customer specifications for composition and combustion characteristics is provided. The engineered fuel product is preferably a high-BTU, alternative fuel that burns cleaner than coal or petroleum coke (petcoke) and has significantly reduced NOx, $SO_2$ and GHG emissions.

11 Claims, 9 Drawing Sheets

(56) References Cited

U.S. PATENT DOCUMENTS

| | | | |
|---|---|---|---|
| 6,271,270 B1 | 8/2001 | Muzzy et al. | |
| 6,635,093 B1 | 10/2003 | Schoen et al. | |
| 6,692,544 B1 * | 2/2004 | Grillenzoni | 44/589 |
| 7,252,691 B2 * | 8/2007 | Philipson | 44/552 |
| 7,341,156 B2 | 3/2008 | Bohlig et al. | |
| 7,355,521 B2 | 4/2008 | McCauley et al. | |
| 7,419,514 B2 | 9/2008 | Whitney | |
| 7,674,303 B2 | 3/2010 | Flanery et al. | |
| 7,869,900 B2 | 1/2011 | McCauley et al. | |
| 8,318,064 B2 | 11/2012 | Parish | |
| 8,349,034 B2 | 1/2013 | Calabrese et al. | |
| 8,382,863 B2 | 2/2013 | Bohlig et al. | |
| 8,444,721 B2 | 5/2013 | Bai | |
| 8,523,962 B2 | 9/2013 | Bohlig et al. | |
| 8,906,119 B2 | 12/2014 | Bohlig et al. | |
| 2002/0184816 A1 | 12/2002 | Philipson | |
| 2003/0153797 A1 | 8/2003 | Percell | |
| 2006/0032113 A1 | 2/2006 | Whitney | |
| 2006/0112616 A1 | 6/2006 | Noll et al. | |
| 2006/0123697 A1 | 6/2006 | Jansen | |
| 2006/0153797 A1 | 7/2006 | Bortolotto et al. | |
| 2006/0254957 A1 | 11/2006 | Bohlig et al. | |
| 2007/0075870 A1 | 4/2007 | McCauley et al. | |
| 2007/0078524 A1 | 4/2007 | McCauley et al. | |
| 2007/0182776 A1 | 8/2007 | Parish et al. | |
| 2008/0237093 A1 | 10/2008 | Bohlig et al. | |
| 2008/0290006 A1 | 11/2008 | Duffy et al. | |
| 2009/0235577 A1 | 9/2009 | Flanery et al. | |
| 2009/0272028 A1 | 11/2009 | Drozd et al. | |
| 2010/0018113 A1 | 1/2010 | Bohlig et al. | |
| 2010/0031560 A1 | 2/2010 | Calabrese et al. | |
| 2010/0126061 A1 | 5/2010 | Flanery et al. | |
| 2010/0144905 A1 * | 6/2010 | Reaveley et al. | 518/702 |
| 2011/0209397 A1 | 9/2011 | Bohlig et al. | |
| 2012/0037733 A1 | 2/2012 | Gitschel | |
| 2012/0048974 A1 | 3/2012 | Gitschel | |
| 2012/0048975 A1 | 3/2012 | Gitschel | |
| 2012/0190102 A1 | 7/2012 | Gitschel et al. | |

FOREIGN PATENT DOCUMENTS

| | | |
|---|---|---|
| WO | 2012071060 A2 | 5/2012 |
| WO | 2012071060 A3 | 5/2012 |
| WO | 2012071112 A1 | 5/2012 |

OTHER PUBLICATIONS

Kela Energy, LLC; CIBO, Technical Focus Group Environmental & Energy Committee Meetings; Sep. 2009; KeLa Energy, LLC; U.S.; Powerpoint; 16 pages.

Fyffe, John R. et al.; Residue-Derived Solid Recovered Fuel for Use in Cement Kilns; Jul. 1, 2012; 114 pages.

United States Environmental Protection Agency (USEPA)—Office of Resource Conservation and Recovery; Request for comfort letter (and enclosures) from Waste Management to USEPA dated Mar. 16, 2012; 18 pages.

United States Environmental Protection Agency (USEPA)—Office of Resource Conservation and Recovery; Letter (and enclosures) from Waste Management to USEPA dated Dec. 6, 2012 regarding third party FOIA requests; 257 pages.

United States Environmental Protection Agency (USEPA)—Office of Resource Conservation and Recovery; Comfort letter (and various footnoted materials) from USEPA to Waste Management dated Aug. 22, 2013; 97 pages.

Sandy Bauers, "Trash plan—and pellets—approved; more talk about all"; Philly.com, Posted Thursday, Jun. 7, 2012; 5 pages.

* cited by examiner

FIG. 9a
Heat Content of Common Plastic Resins
(Society of Plastics Industry (SPI) Resin Codes)

| Plastic | Resin Code | BTU/# |
|---|---|---|
| Polyethylene Terephthalate (PET) | 1 | 10,250 |
| High-Density Polyethylene (HDPE) | 2 | 9500 |
| Polyvinyl Chloride (PVC) | 3 | PVC is ejected via Near Infrared (NIR) optical sorting. PVC is not suitable for engineered fuel product due to its high chlorine content |
| Low-Density Polyethylene (LDPE) | 4 | 12,050 |
| Polypropylene (PP) | 5 | 19,000 |
| Polystyrene (PS) | 6 | 17,800 |
| Other (i.e. acrylics, polyesters, polycarbonates, bio-plastics, etc.) | 7 | 10,250 |
| Acrylonitrile Butadiene Styrene (ABS) | 9 | ---- |

FIG. 9b
Heat Content of Fiber

| Fiber | BTU/# |
|---|---|
| Newspaper | 8000 |
| Corrugated Cardboard | 8250 |

PROCESS AND SYSTEM FOR PRODUCING ENGINEERED FUEL

CROSS REFERENCE TO RELATED APPLICATIONS

This application claims the benefit and priority benefit of U.S. Provisional Patent Application Ser. No. 61/756,417, filed Jan. 24, 2013, titled "PROCESS ENGINEERED FUEL," the disclosure of which is incorporated herein in its entirety.

BACKGROUND

1. Field of Invention

This invention relates generally to the production of engineered fuel and to a process and system for producing an engineered fuel product that meets customer specifications for composition and/or combustion characteristics.

2. Description of the Related Art

The following descriptions and examples are not admitted to be prior art by virtue of their inclusion within this section.

It is known in the art that landfill-bound waste can instead be processed to form a fuel product that can be used as an alternative energy source to replace or supplement traditional energy sources such as coal, petroleum coke and woody biomass. Improvements to this technology are desired.

SUMMARY

The following presents a simplified summary of the disclosed subject matter in order to provide a basic understanding of some aspects of the subject matter disclosed herein. This summary is not an exhaustive overview of the technology disclosed herein.

In certain illustrative embodiments, a process for producing an engineered fuel product is provided. A municipal solid waste can be supplied that includes heavy weight materials, medium weight materials and light weight materials. The municipal solid waste can be shredded. All or substantially all of the heavy weight materials can be removed from the municipal solid waste. The medium weight materials can be separated from the light weight materials in the municipal solid waste. The medium weight materials and the light weight materials can be proportionally recombined to form a recombined stream. A clean stream can be proportionally mixed with the recombined stream to form a fine-tuned recombined stream. The clean stream can include fibers and clean plastics. The fine-tuned recombined stream can be densified to form the engineered fuel product.

In certain illustrative embodiments, the clean stream can consist essentially of fibers and clean plastics. The clean stream and the recombined stream can each have a biogenic content, and the fine-tuned recombined stream can have a lower biogenic content than the recombined stream when the clean stream includes more plastics than clean fibers. The clean stream and the recombined stream can also each have a heat content, and the fine-tuned recombined stream can have a lower heat content than the recombined stream when the clean stream includes more clean fibers than plastics.

In certain illustrative embodiments, a clean stream can be proportionally mixed with the municipal solid waste prior to shredding the municipal solid waste. Also, a clean stream can be proportionally mixed with the municipal solid waste after shredding the municipal solid waste but before removing all or substantially all of the heavy weight materials from the municipal solid waste. The engineered fuel product can be in pelletized form with a weight density of about 30 pounds/cubic ft. Alternatively, the engineered fuel product can be in non-pelletized yet densified form with a weight density in the range of about 18-25 pounds/cubic ft. The medium weight materials can include fibers and rigid plastic and the light weight materials can include film plastic and foam plastic. The fibers and clean plastics can make up greater than or equal to about 99 percent by volume of the engineered fuel product. An engineered fuel product can be formed by the process described in the illustrative embodiments set forth herein.

BRIEF DESCRIPTION OF THE DRAWINGS

A better understanding of the presently disclosed subject matter can be obtained when the following detailed description is considered in conjunction with the following drawings, wherein:

FIG. 9a is a chart showing the heat content of common plastic resins; and

FIG. 9b is a chart showing the heat content of common fibers.

Figure 1:
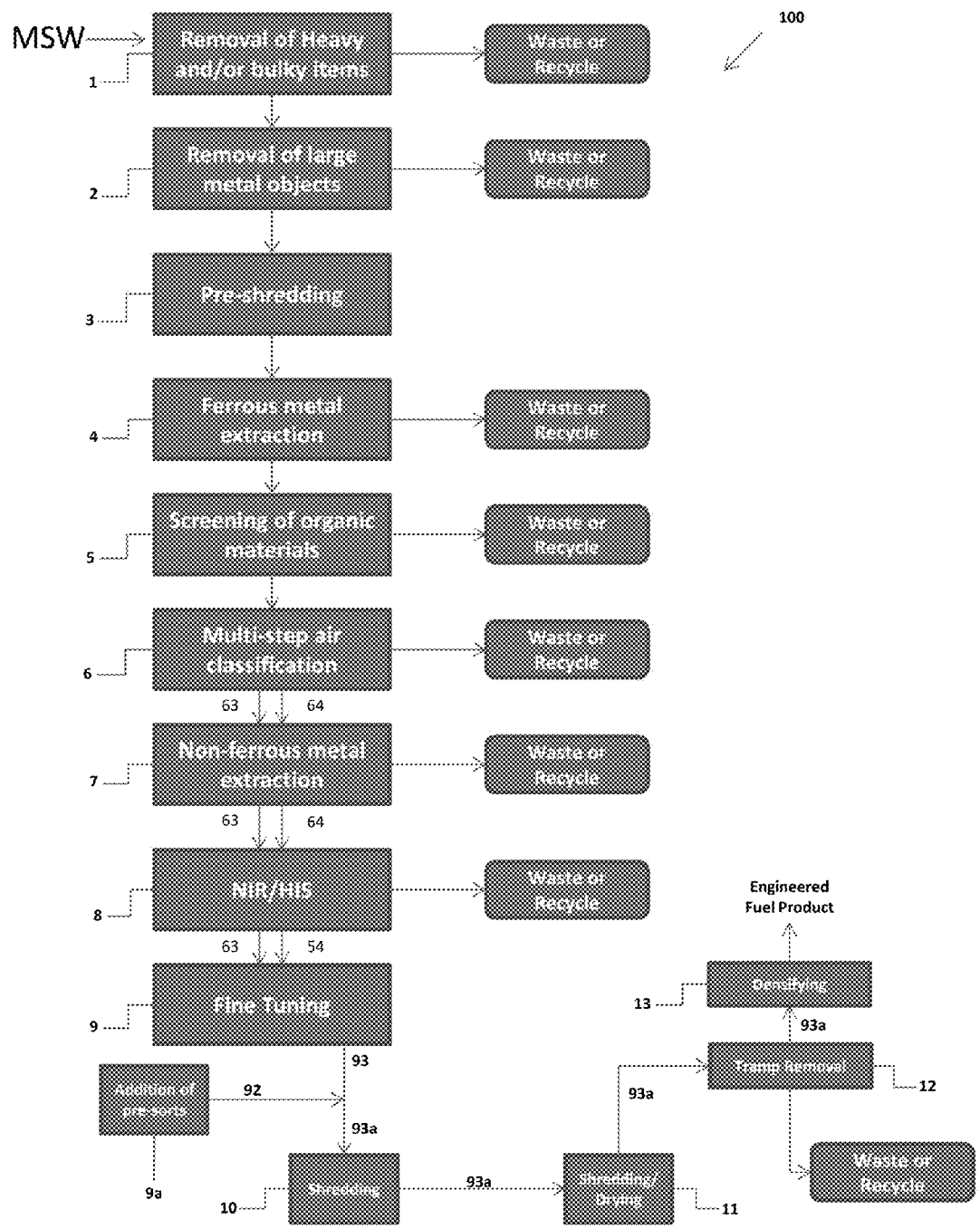
FIG. 1 is a flow diagram of a process for producing an engineered fuel product in accordance with an illustrative embodiment of the presently disclosed subject matter.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates generally to the production of engineered fuel and to a process and system for producing an engineered fuel product. The subject matter is described more fully hereinafter with reference to the accompanying drawings in which embodiments of the process and system are shown. The process and system may, however, be embodied in many different forms and should not be construed as limited to the embodiments set forth herein; rather, these embodiments are provided so that this disclosure will be thorough and complete, and will fully convey the scope of the process and system to those skilled in the art.

In certain illustrative embodiments, a process is provided for extracting commodities of value such as fibers and clean plastics from municipal solid waste that would otherwise be landfilled. As used herein, the term "municipal solid waste" or "MSW" means waste that includes, but is not limited to, one or more of the following materials: heavy weight materials (i.e., aggregates, glass, textiles, rubber, etc. . . . ), medium weight materials (i.e., fibers and rigid plastics), light weight materials (i.e., foam plastics and film plastics), PVC plastics, ferrous and non-ferrous metals, inert residues, organic materials (i.e., food waste) and very heavy and/or bulky materials. As used herein, the term "fibers" includes paper and/or cardboard and like materials, the term "clean plastics" includes rigid plastics, foam plastics and film plastics and like materials, and the term "undesirable plastics" means plastics that are known to contain high levels of chlorine (i.e., PVC plastics).

In certain illustrative embodiments, municipal solid waste containing pre-recycle materials can undergo a multi-step, mechanically engineered process to prepare an engineered fuel product. The engineered fuel product is preferably a high-BTU, alternative fuel that burns cleaner than coal or petroleum coke (petcoke) and has significantly reduced NOx, $SO_2$ and GHG emissions. The engineered fuel product can consist of 99% or greater post-recycle fibers and clean plastics, in certain illustrative embodiments. As used throughout this application, the term "%" means volume percent unless otherwise specifically indicated.

The presently disclosed process and system for producing an engineered fuel product are preferably precise and rigorous, and can result in a homogeneous and highly consistent product designed to meet the customer's specifications for composition and/or combustion characteristics. In certain illustrative embodiments, a heterogenous, contaminated raw waste material with low commercial fuel and recycling value can be converted into a high-value, high-BTU fuel product. Ongoing batch sampling and analysis and continuous spectroscopic analysis of feedstock can ensure fuel integrity and composition. In certain illustrative embodiments, ferrous and non-ferrous metals and undesirable plastics can be extracted from the municipal solid waste as rejected materials. After these rejected materials have been extracted and isolated from the commodities of value (primarily fibers and clean plastics), the commodities of value can be recombined to produce an engineered fuel product with a consistent and predictable heating value. The engineered fuel product can be managed and sold as a valuable commodity.

The presently disclosed process and system are substantially different from previous approaches that simply shred and pelletize refuse-derived fuel. Instead, the presently disclosed process and system can transform materials that would otherwise be disposed into commodities that can be beneficially reused and that meet customer specifications for composition and/or combustion characteristics.

In certain illustrative embodiments, a single plant utilizing the presently disclosed process and system can potentially handle approximately 300,000 tons per year or 1,000 tons per day of in-bound feedstock material. The primary feedstock is preferably non-hazardous secondary material ("NHSM") derived from municipal solid waste. The municipal solid waste may have undergone some preliminary source separation by households or businesses to extract recyclables that were collected and processed through local recycling programs where implemented. The primary feedstock may also be augmented with commercial and industrial secondary material streams such as hard-to-recycle plastics.

This feedstock, otherwise bound for the landfill, can be diverted to the engineered fuel processing plant where mechanical and spectroscopic equipment can segregate non-recyclables from fibers and clean plastics for fuel production. In certain illustrative embodiments, the presently disclosed process and system can capture about 50-55% of the total, raw in-bound material stream for production of the engineered fuel product. The remaining paper, plastics, metals, glass, other inert residues and food wastes can be extracted for recycling, eventual treatment or disposal. For example, old corrugated containers and ferrous and non-ferrous metals, which can comprise about 5-7% of the in-bound material stream, can be extracted for recycling. Also, organic materials (primarily food waste), which can comprise about 20-30% of the in-bound material stream, can be extracted for potential treatment via composting or anaerobic digestion. Finally, rejected heavy materials, inert residues and PVC plastics, which can comprise about 20-30% of the in-bound material stream, can be sent to landfill.

Figure 2:
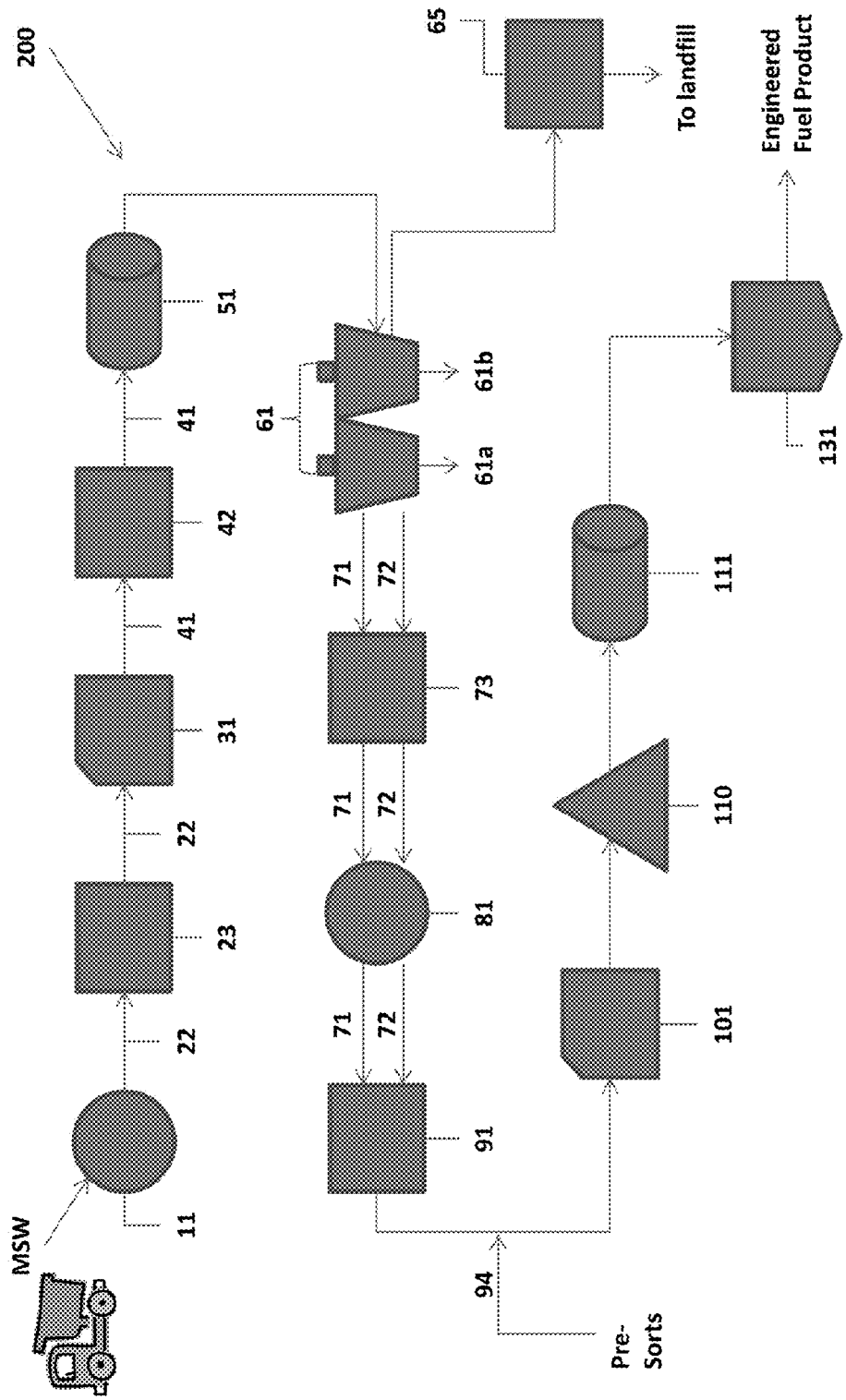
FIG. 2 is a flow diagram of equipment or materials used in a system for producing an engineered fuel product in accordance with an illustrative embodiment of the presently disclosed subject matter.
Figure 7:
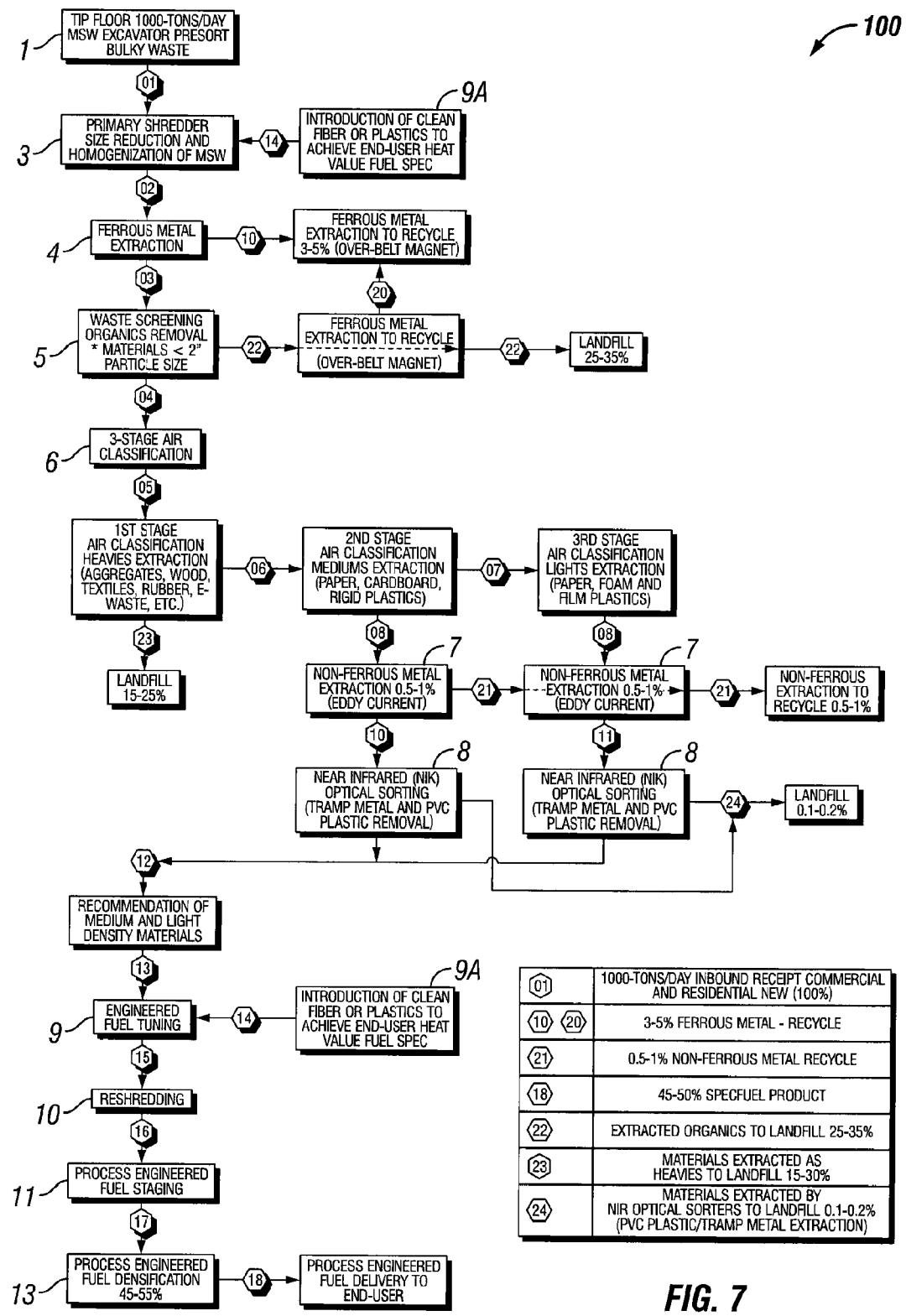
FIG. 7 is a flow diagram of a process for producing an engineered fuel product in accordance with an illustrative embodiment of the presently disclosed subject matter.
Figure 8:
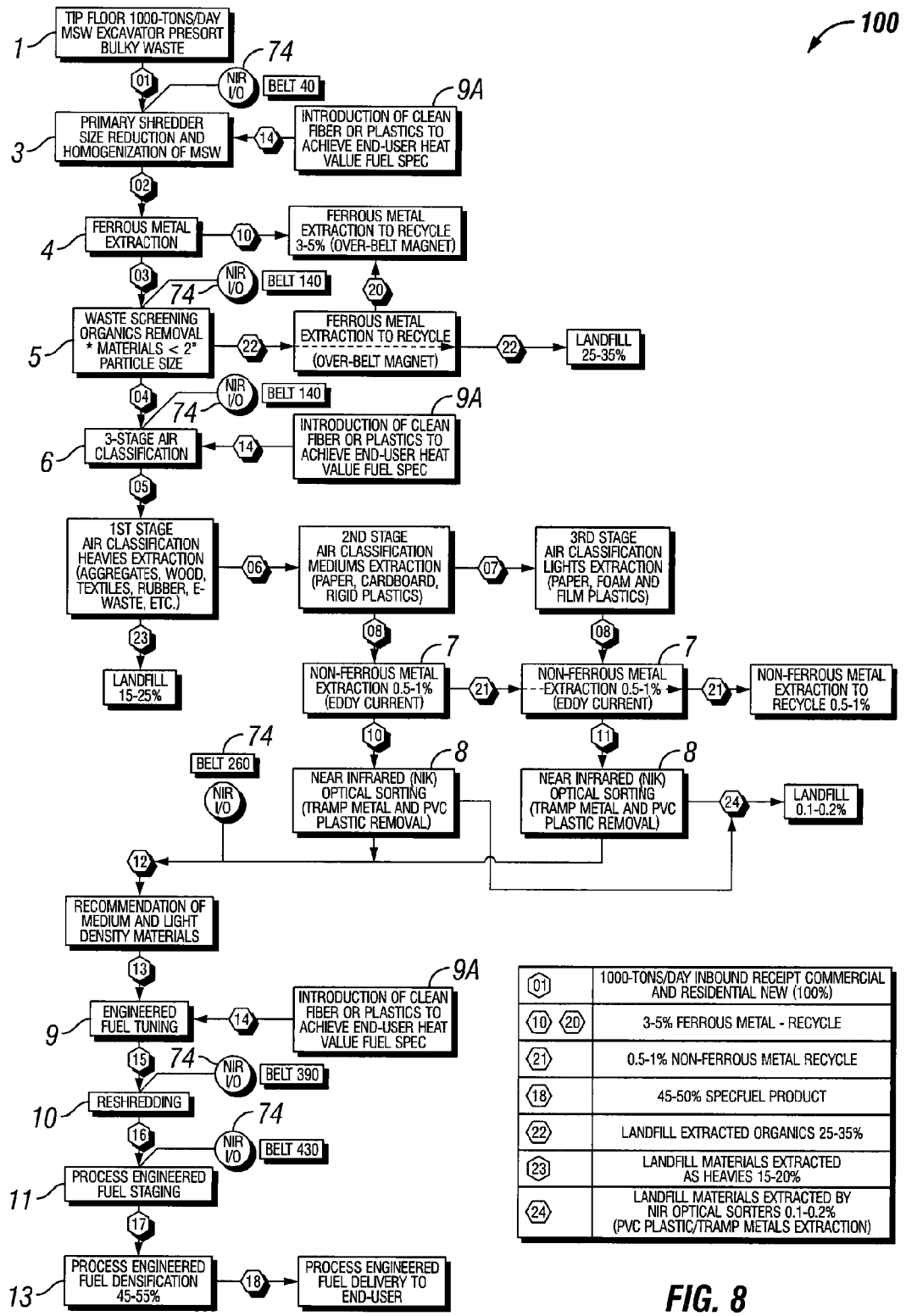
FIG. 8 is a flow diagram of a process for producing an engineered fuel product in accordance with an illustrative embodiment of the presently disclosed subject matter.

Flow diagrams for various illustrative embodiments of the presently disclosed process for producing engineered fuel are shown in FIGS. 1 & 7-8 hereto, generally at 100, with related equipment and materials for an illustrative embodiment of the presently disclosed system for producing engineered fuel shown in FIG. 2 hereto, generally at 200. FIGS. 1 & 7-8 each illustrate an exemplary process that may include a plurality of sequential, non-sequential, or sequence independent steps or stages for preparing an engineered fuel product using, for example, the system shown in FIG. 2. Note that the processes described in FIGS. 1 & 7-8 are exemplary, and may be performed in different orders and/or sequences as dictated or permitted by system 200, and any alternative embodiments thereof. In addition, the process described herein is not limited to the specific use of system 200, but may be performed using any system that is capable of producing an engineered fuel product as described in connection with system 200. Numerous arrangements of the various stages, techniques, equipment and materials can be utilized. In addition, not all stages, techniques, equipment and materials described herein need be utilized in all embodiments.

In certain illustrative embodiments, the process and system can comprise one or more of the following stages:

Stage 1: Removal of Heavy and/or Bulky Items

In a first stage 1, in-bound solid waste collection vehicles entering the process facility can be diverted from the landfill and directed to discharge their municipal solid waste loads for presorting. In certain illustrative embodiments, the loads can be placed onto an inbound tipping floor 11. The municipal solid waste can be presorted on tipping floor 11 to remove very heavy and/or bulky materials deemed unsuitable for the engineered fuel product (i.e., tires, mattresses, post-consumer carpet, etc. . . . ). On tipping floor 11, readily identifiable, high-quality, and safely accessible recyclable fibers and clean plastics can also be removed. Removal can be performed using excavators and wheel loaders, as would be understood by one of ordinary skill in the art. The remaining raw materials comprise a treatable municipal solid waste stream that can then proceed through the subsequent steps and equipment of the presently disclosed process and system.

Stage 2: Removal of Large Metal Objects

In a second stage 2, large metal objects can be removed from the municipal solid waste. In certain illustrative embodiments, an in-feed belt 22 can mechanically convey the municipal solid waste away from tipping floor 11. While travelling on in-feed belt 22, the municipal solid waste can pass through one or more metal detectors 23, which can detect and eject large metallic items such as propane tanks and other large metallic or dense items which may be contained within non-transparent containers and bags in the municipal solid waste.

Stage 3: Slow-Speed, High Torque, Primary Pre-Shredding

In a third stage 3, the municipal solid waste can be pre-shredded. In certain illustrative embodiments, in-feed belt 22 can deliver the municipal solid waste to a primary shredder 31. Pre-shredding can break up the materials in the municipal solid waste to produce a homogeneous material suitable for further mechanical processing. Primary shredder 31 can reduce the materials in the municipal solid waste to 12-inch minus dimensional size, in certain illustrative embodiments. In general, shredder 31 can reduce the municipal solid waste to a more manageable size and homogenize and volumetrically expand the raw materials therein.

Stage 4: Ferrous Metal Extraction

In a fourth stage 4, ferrous metals can be extracted. In certain illustrative embodiments, the municipal solid waste can be conveyed away from primary shredder 31 via fourth stage belt 41. An over-belt magnet 42 can be positioned over fourth stage belt 41 to extract ferrous metals. Throughout the presently disclosed process, over-belt magnets can be positioned at some or all extraction points to extract any remaining ferrous metals in the municipal solid waste and maximize ferrous metal recovery. All ferrous metals extracted from the municipal solid waste are preferably recycled. In certain illustrative embodiments, metal extraction and recovery for recycle of ferrous & non-ferrous metals can represent around 5% of the total raw material mass balance, which represents all or substantially all of the ferrous & non-ferrous metals from the municipal solid waste.

Stage 5: Screening of Organic Materials

In a fifth stage 5, organic materials can be screened from the municipal solid waste. In certain illustrative embodiments, the municipal solid waste from fourth stage belt 41 can undergo screening via screener 51. All or substantially all of the organic materials can be extracted via screener 51 to promote a consistent, high heating value in the engineered fuel product. In certain illustrative embodiments, organic materials can represent about 20-30% of the total in-bound municipal solid waste. In certain illustrative embodiments, the organic materials are <2 inches in size, and 90% or more of these organic materials are food waste. Possible treatment options for these organic materials can include composting and/or anaerobic digestion.

Stage 6: Multi-Step Air Classification

In a sixth stage 6, the raw materials in the municipal solid waste can be separated by weight density to produce a plurality of distinct streams. In certain illustrative embodiments, a multi-step air classifier 61 can be utilized to separate the municipal solid waste into a heavy weight materials stream 62, a medium weight materials stream 63 and a light weight materials stream 64. In certain illustrative embodiments, the medium weight materials can represent around 50-55% of the raw-in bound material mass balance.

In a first section 61a, multi-step air classifier 61 can separate the heavy weight materials from the medium weight materials and light weight materials to form heavy weight materials stream 62. The extracted heavy weight materials are typically deemed unsuitable for the engineered fuel product, and after passing under an over-belt magnet 65 to extract remaining ferrous metals, the heavy weight materials stream 62 (primarily inert waste) can be disposed in the landfill. In certain illustrative embodiments, first section 61a can remove all or substantially all of the heavy weight materials from the municipal solid waste, with substantially all of the heavy weight materials comprising at least 25-30% of the municipal solid waste.

In a second section 61b, the multi-step air classifier 61 can separate the medium weight materials from the light weight materials to form a plurality of distinct streams. In an illustrative embodiment, the plurality of distinct streams can comprise medium weight materials stream 63 and light weight materials stream 64, although additional streams of, for example, medium-light weight materials, could also be formed in other embodiments. In certain illustrative embodiments, the separation can be performed by weight density based on air flows, residence times and/or material recirculation. In certain illustrative embodiments, the equipment operators can select materials for recirculation and can move materials between sections 61a and 61b of air classifier 61 to control the materials that ultimately exit air classifier 61. Also, controlled particulate matter air scrubbers (not shown) can be used in classifier 61 to eliminate dust within the negative-air controlled confines of the processing plant, in certain illustrative embodiments.

Stage 7: Eddy Current (Non-Ferrous Metal Extraction)

In a seventh stage 7, non-ferrous metals can be removed for recycling. The medium weight materials stream 63 and light weight materials stream 64 can exit the multi-step air classifier 61 and be discharged onto conveyor lines 71 and 72, respectively. Conveyor lines 71 and 72 can then be exposed to one or more electromagnets 73 (e.g., eddy current) whereby the non-ferrous metals can be removed from the medium weight materials stream 63 and light weight materials stream 64.

Stage 8: Near Infrared (NIR) Spectroscopic/Hyper Spectral Imaging System (HIS) Sorting In an eighth stage 8, the medium weight materials and the light weight materials can undergo two distinct processing steps, in certain illustrative embodiments.

First, the materials can undergo chlorine removal. In certain illustrative embodiments, conveyor line 71 and conveyor line 72 can be routed through an NIR/HIS (near infrared spectroscopic/hyper spectral imaging) sorter 81, such as the one manufactured by TiTech or Steinert. NIR/HIS sorter 81 can be programmed to identify and eject PVC plastic materials with high chlorine content. Chlorine removal is a critical step in the process, in certain illustrative embodiments, as it alters the chemical composition of the engineered fuel product to improve fuel characteristics. NIR/HIS sorter 81 can also be programmed to identify and eject metallic materials not extracted by overbelt magnets or eddy currents. NIR/HIS sorter 81 can preferably provide granular data on plastic content by resin type and percentage, as well as by biogenic fiber components. In certain illustrative embodiments, NIR/HIS sorter 81 can be designed to record up to 27 million detections per second at a 320 pixel resolution. In certain illustrative embodiments, NIR/HIS sorter 81 has the ability to create a data log of all engineered fuel material components in the medium weight materials and the light weight materials by material percentage, i.e., biogenic fiber and plastic.

Second, some or all remaining metals can be removed from the materials. NIR/HIS sorter 81 can identify metals that were not extracted by the previous over-belt magnets and eddy currents in the process. NIR/HIS sorter 81 can detect the light reflected from the objects onto highly sensitive NIR sensors and, in certain illustrative embodiments, is capable of detecting objects as small as one-half inch in size. NIR/HIS sorter 81 can identify and pinpoint the location of a particular object in the medium weight materials on conveyor line 71 or the light weight materials on conveyor line 72. A precise puff of air from nozzles associated with the NIR/HIS sorter 81 can eject any undesirable materials before the municipal solid wastes on conveyor lines 71 and 72 are discharged from the NIR/HIS sorter 81, in certain illustrative embodiments.

In certain illustrative embodiments, NIR equipment can also be utilized in various other locations in the process and system. For example, as shown in FIG. 8 hereto, a NIR scanner 74 can be disposed at one or more of the following locations: before third stage 3 (pre-shredding), before fifth stage 5 (organics screening), before and after sixth stage 6 (multi-step air classification), before stage 10 (shredding) and before stage 11 (staging/drying). NIR scanners 74 can detect moisture in the municipal solid waste. The data recorded by NIR scanners 74 can be used to either increase or reduce the process flow rate. For example, when the process flow rate is reduced, more moisture laden material can be extracted from the municipal solid waste, preferably at an early stage of the process and system to promote more efficient separation of heavy weight materials, medium weight materials and light weight materials. NIR scanners 74 can also detect moisture in the municipal solid waste at later stages in the process and system to control the moisture content of the engineered fuel product.

Stage 9: Fine Tuning of Engineered Fuel Product

In a ninth stage 9, the medium weight materials and light weight materials that were previously separated during sixth stage 6 can be proportionately recombined. Also, in a related stage 9a, pre-sorted materials can be proportionally added to the recombined stream of medium weight and light weight materials to produce a "fine-tuned" recombined stream. The "fine-tuned" recombined stream can be used to produce an engineered fuel product that meets customer specifications for various desired features.

In certain illustrative embodiments, the medium weight materials and light weight materials on conveyor lines 71 and 72 are recombined to form recombined stream 93. For example, conveyor lines 71 and 72 can be combined in recombiner 91. The mix of medium weight materials and light weight materials can produce a fuel that is approximately 50% fiber and 50% plastic with a heat content of approximately 9000 Btu/pound, in certain illustrative embodiments.

In certain illustrative embodiments, selected clean materials known as "pre-sorts" can be added to recombined stream 93. The pre-sorts can be proportionally incorporated into recombined stream 93 to produce a fine-tuned recombined stream 93a. The pre-sorts can comprise a clean stream 92 of fibers and/or clean plastics, in certain illustrative embodiments. For example, the clean plastics pre-sorts can comprise polyethylene, polypropylene and/or polystyrene plastics all having a known BTU content, such as post-industrial waste like polypropylene automobile carpet trims and/or polyethylene food wrappers.

As used herein, the term "fine-tuned recombined stream" means a stream comprising recombined stream 93 and clean stream 92. The materials in clean stream 92 can have a known heat content that will produce desired properties in the engineered fuel product. Examples of known heat contents for various fibers and plastics are shown in FIGS. 9a and 9b hereto.

In certain illustrative embodiments, adding pre-sorts mainly comprising fibers will typically reduce the heating value and increase the biogenic content of the engineered fuel product. As used herein, the term "biogenic content" means content of plant-based carbon molecules. Higher biogenic carbon fuels are of value to utility-based end-users seeking a lower heat content/higher biogenic content fuel that potentially will qualify in their fuel portfolio for renewable energy credits. In certain illustrative embodiments, clean stream 92 and recombined stream 93 will each have a biogenic content and fine-tuned recombined stream 93a will have a higher biogenic content than recombined stream 93 when clean stream 92 comprises more fibers than clean plastics.

In other illustrative embodiments, adding pre-sorts mainly comprising clean plastics will typically increase the heat content of the engineered fuel product. Thus, fine tuning can chemically improve the as-fired energy content of the engineered fuel product for end-users seeking a higher heating value fuel. For example, a mix of 30% fibers/70% plastics can produce a 11,500 Btu/pound fuel, a mix of 50% fibers/50% plastics can produce a 9000 Btu/pound fuel, and a mix of 70% fibers/30% plastics can produce a 7500 Btu/pound fuel, in certain illustrative embodiments. In certain illustrative embodiments, clean stream 92 and recombined stream 93 will each have a heat content and fine-tuned recombined stream 93a will have a higher heat content than recombined stream 93 when clean stream 92 comprises more clean plastics than fibers. Also, in certain illustrative embodiments, binding and scrubbing materials can be added to fine-tuned recombined stream 93a to adjust the biogenic content and enhance the emissions characteristics of the engineered fuel product.

In certain illustrative embodiments, the pre-sorts can be added to recombined stream 93 via a by-pass conveyer 94. The pre-sorts from by-pass conveyer 94 can be incorporated at a metered rate into recombined stream 93. Preferably, the pre-sorts will be stored separately from any inbound municipal solid waste coming in the plant.

In certain illustrative embodiments, pre-sorts can be added to the municipal solid waste at other locations besides, or in addition to, the recombined stream 93. For example, as shown in FIG. 7, pre-sorts in the form of clean plastics or fibers can be added to the municipal solid waste at one or more of third stage 3 (pre-shredding) and/or in the recombined stream 93 at ninth stage 9 (fine tuning). Further, as shown in FIG. 8, pre-sorts in the form of clean plastics or fibers can be added to the municipal solid waste at one or more of third stage 3 (pre-shredding), prior to sixth stage 6 (multi-step air classification) and/or in the recombined stream 93 at ninth stage 9 (fine tuning). In certain illustrative embodiments, adding pre-sorts to the municipal solid waste relatively early in the process (i.e., prior to sixth stage 6) allows a user to reduce the moisture percentage in the municipal solid waste and promote more efficient separation of heavy weight materials, medium weight materials and light weight materials.

Stage 10: High Speed Shredding

In a tenth stage 10, fine-tuned recombined stream 93a can undergo additional shredding. In certain illustrative embodiments, fine-tuned recombined stream 93a can be passed through a high speed shredder 101 that can shred stream 93a to <2-inch minus particle size. The purpose of this additional shredding is to produce a particle size that can easily pass through the dies 133 of densifier 131 (as described in Stage 13) without causing plugging.

Stage 11: Staging/Drying

In an eleventh stage 11, staging and drying can occur. Fine-tuned recombined stream 93a can be staged and dried in a dryer 110 as needed. For example, in certain illustrative embodiments, optimal performance in densifier 131 of Stage 13 requires that the inbound feed to densifier 131 should have approximately 15% moisture content. During densification, densifier 131 will typically release approximately 5% moisture in the form of steam, thus yielding a process engineered fuel product with a moisture content of approximately 10%. In certain illustrative embodiments, this 10% moisture content can be achieved by utilizing dryer 110 and/or by adding dry pre-sorts to the municipal solid waste at various stages of the process.

Stage 12: Final Tramp Material Removal

In a twelfth stage 12, the fine-tuned recombined stream can undergo at least one final extraction step to ensure elimination of tramp metals. As used herein, the term "tramp metals" means ferrous or non-ferrous metals and inert fines of 1-inch or less that that have not already been removed and that could damage the fuel production equipment. In certain embodiments, fine-tuned recombined stream 93a can pass through a tramp separator 111 to extract tramp metals. In other embodiments, tramp separator 111 is not utilized, and the fine-tuned recombined stream is conveyed directly from dryer 110 to densifier 131 of Stage 13.

Stage 13: Engineered Fuel Production

Figure 3:
FIG. 3 is a top view of an engineered fuel product in fluff form in accordance with an illustrative embodiment of the presently disclosed subject matter.

In a thirteenth stage 13, an engineered fuel product can be produced. Prior to thirteenth stage 13, fine-tuned recombined stream 93a is in a low-density form commonly referred to as "fluff," as illustrated in FIG. 3 hereto. A fuel in "fluff" form typically has a weight density of about 6-10 pounds/cubic ft and a particle size of approximately 2 inches with a generally 2-dimensional (flat) structure. In thirteenth stage 13, an engineered fuel product with a higher density than fluff can be manufactured that also meets customer specifications for fuel content and/or composition, according to the illustrative embodiments provided herein. In certain illustrative embodiments, the density of the engineered fuel product can be controlled via manipulation of heat and force in the production equipment.

Figure 6:
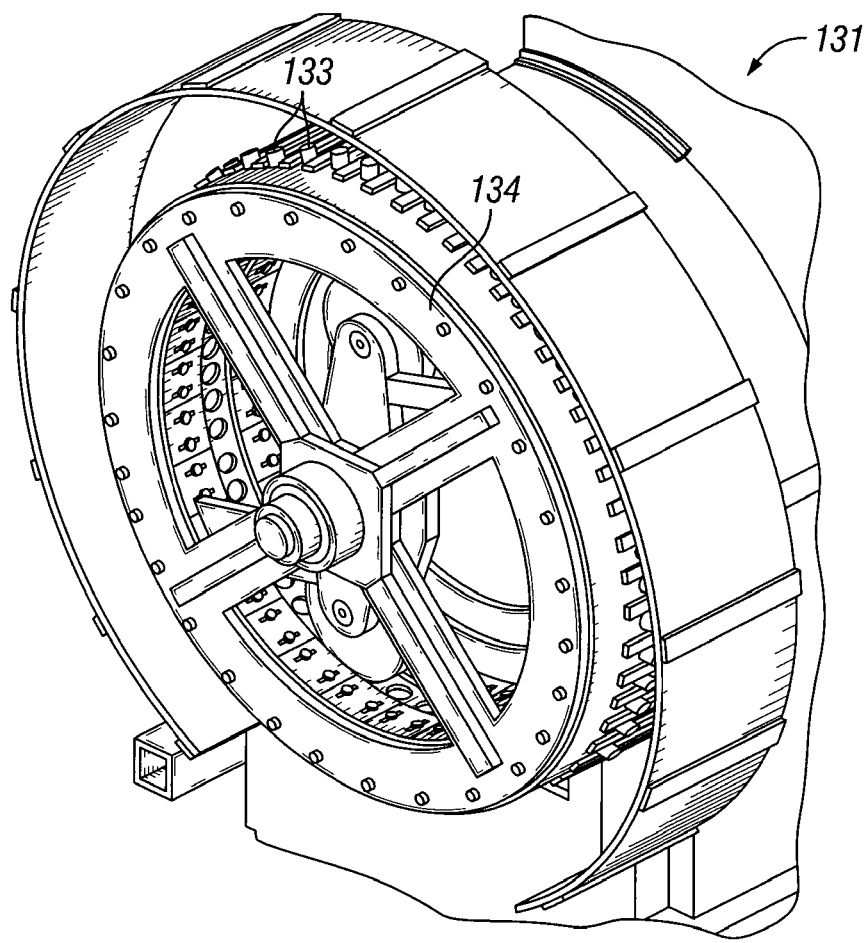
FIG. 6 is a front perspective view of a densifier used in accordance with an illustrative embodiment of the presently disclosed subject matter.

In certain illustrative embodiments, fine-tuned recombined stream 93a can be delivered to a densifier 131, as illustrated in FIG. 6 hereto. In densifier 131, fine-tuned recombined stream 93a can be mechanically driven into a plurality of dies 133. The materials in fine-tuned recombined stream 93a are compressed under high pressure via one or more press wheels 134 which rotate within dies 133. Dies 133 can also be heated to allow the plastic constituent within fine-tuned recombined stream 93a to become malleable. Densifiers such as those manufactured by Lundell Enterprises of Cherokee, Iowa may be used, although densifiers by other manufacturers may also be utilized.

Figure 4:
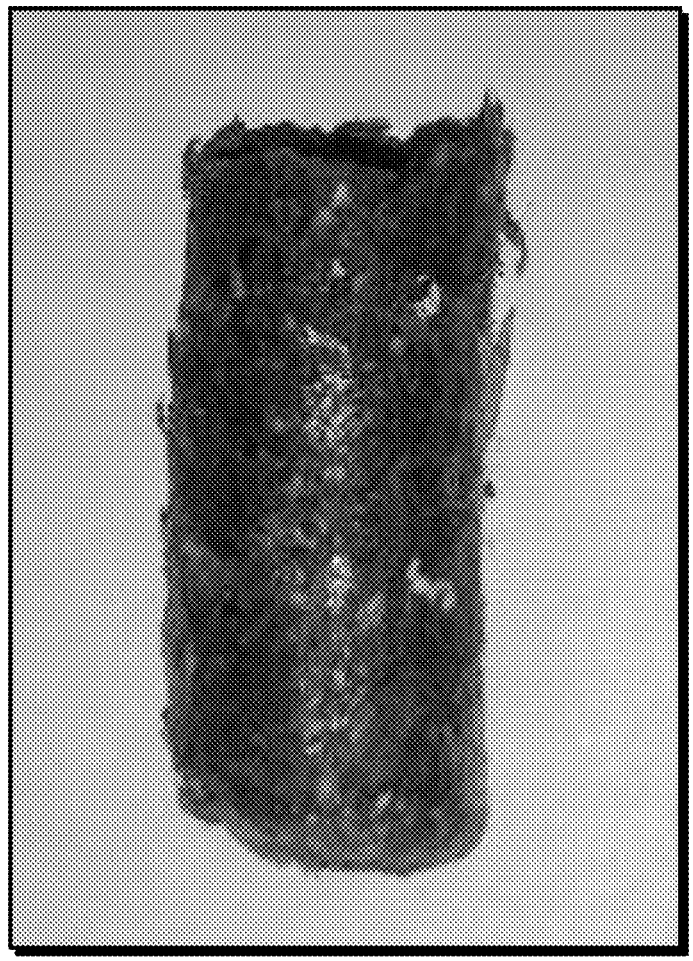
FIG. 4 is a top view of an engineered fuel product in pelletized form in accordance with an illustrative embodiment of the presently disclosed subject matter.

In certain illustrative embodiments, dies 133 can be heated to a temperature in the range of approximately 200 to 250 degrees Fahrenheit, whereby constant heat is preferably maintained within dies 133 via electrical or other heating methods. The heat in dies 133 coupled with the force of press wheels 134 causes the plastic constituent in fine-tuned recombined stream 93a to become malleable which in turn encases the material in fine-tuned recombined stream 93a within a hardened shell to form a pelletized fuel product. A representative example of a pelletized fuel product is shown in FIG. 4 hereto.

In certain embodiments, the engineered fuel product in highly-dense pelletized form has a consistent size (⅞ inch diameter×1 to 2 inch length) and an average weight density of about 30 pounds/cubic ft (about 810 pounds/cubic yd).

Figure 5:
FIG. 5 is a top view of an engineered fuel product in densified crumb form in accordance with an illustrative embodiment of the presently disclosed subject matter.

In another illustrative embodiment, an engineered fuel product in "crumb" form can be produced. In this embodiment, fine-tuned recombined stream 93a passes through dies 133 at a higher volume and lower temperature than when the pelletized engineered fuel product is produced. In a specific embodiment, electrical heat is not provided to dyes 133, and instead fine-tuned recombined stream 93a is heated by the friction between dyes 133 and press wheels 134. As a result, fine-tuned recombined stream 93a experiences about the same amount of force via direct pressure within dies 133, with a reduced temperature exposure. This can produce a "crumb" material that is finely shredded and less dense than the pelletized product. For example, as compared to the pelletized product having a size of ⅞ inch diameter and 1-2 inches in length, and the fluff material having a particle size of approximately 2 inches in a primarily 2-dimensional (flat) configuration, the "crumb" material has a reduced particle size of approximately 1 inch in a primarily 3-dimensional (stacked or piled) configuration. A representative example of an engineered fuel product in "crumb" form is shown in FIG. 5 hereto.

In certain illustrative embodiments, the engineered fuel product in partially densified "crumb" form has an average weight density of about 18-25 pounds/cubic ft, which is significantly less than the average weight density of about 30 pounds/cubic ft for the engineered fuel product in pelletized form, and significantly more than the average weight density of about 6-10 pounds/cubic ft for the mix of medium weight and light weight materials in fluff form.

The "crumb" material has proven beneficial for end users due to the lighter nature of the fuel and its ability to be introduced to the combustion process via air induction and/or mechanical introduction or other means in locations where a pelletized fuel product is too large to fit. The lighter crumb material can also be introduced in varying stages of the end process due to the low retention time and quick ignition. It has also been observed that, in certain illustrative embodiments, utilizing the engineered fuel product in a partially densified "crumb" form yields the following advantages: (i) engineered fuel production yields have increased; (ii) engineered fuel transport vehicles continue to achieve maximum transportation axle weights, while fluff could not achieve the required axle weights; (iii) end-users have seen improved combustion kinetics in their combustion units; (vi) greater density prevents the fuel products from being dispersed by prevailing winds; and (v) end-users have greater flexibility in how and where the engineered fuel product is introduced to the combustion zone.

The engineered fuel product manufactured according to the process and system described herein can have the product specifications set forth below, in certain illustrative embodiments. These specifications were developed based on engineering controls and verified with a week of daily composite sampling and analysis. Three test burns of process engineered fuel were conducted at a major global cement manufacturer's facility, with progressively larger amounts of engineered fuel combusted in each of the trials (500 tons, 1,000 tons and 2,000 tons). Key results are incorporated below.

Ongoing fuel batch sampling and analysis for customers, and feedstock composition analysis via spectroscopic equipment can ensure that the production process continues to produce a highly consistent engineered fuel product that meets the specifications set forth herein.

Fuel Composition:

The composition of the process engineered fuel product can be 99% or greater post-recycle fibers and plastic, in certain illustrative embodiments. This distinguishes the process engineered fuel product from traditional refuse derived fuel ("RDF"), including pelletized RDF, which is not processed as rigorously and is contaminated with far higher percentages of inert materials, metals and wet organics. Whether in fluff or pelletized form, RDF would typically not be expected to meet a criterion of 1% or less contamination or unsuitable materials in the fuel mix.

Fuel Heat Content:

The ratio of fibers to plastics may be adjusted for production batches to meet precise customer specifications within ±10%. The fuel heat content of specific formulations can fall between a low of 7,500 Btu/pound and a high of 11,000 Btu/pound based on customer specifications, in certain illustrative embodiments. This feature also distinguishes the process engineered fuel product from RDF, as the heating value of RDF may range up to a high of about 6,500 Btu/pound, but is still significantly below the low-end range heating value of the process engineered fuel product disclosed herein. The high heating value of RDF would not be expected to consistently achieve even the low-end heating value of the process engineered fuel product, which is 7,500 Btu/pound, and the heating value would not be consistent, i.e., could not be effectively targeted to meet a specific value.

Heating Value of the Feedstock Components:

The heating value of each feedstock material stream comprising the process engineered fuel product can be greater than 5,000 Btu/pound. For example, the medium weight materials comprising fibers and rigid plastics can have an average heating value of 6,000 Btu/pound, and the light weight materials comprising film plastics and foam plastics can have an average heating value of greater than 11,000 Btu/pound, in certain illustrative embodiments.

Heating Value and Composition Engineered to Meet Precise Customer Specifications:

The composition and fuel heating value of the process engineered fuel product can be adjusted to meet specifications provided by utility customers based on their combustion unit firing diagrams. For example, to ensure fuel integrity, the fuel composition ratios of fibers to plastics may range from 70:30 fibers/plastics resulting in a heating value of 7,500 Btu/pound, to a ratio of 30:70 fibers/plastics for a fuel heating value of 11,000 Btu/pound. The fuel composition can be verified based on analyses of the process engineered fuel product and continuous process controls including spectroscopic characterization as described in eighth stage 8 above. This ensures that a consistent product that burns evenly without spiking is produced.

Fuel Size:

Fuel feedstock can be mechanically-sized and can be formed into a cylindrical shape (⅞-inch diameter by 1 to 2-inches in length) in pelletized form or a less dense "crumb" form.

Fuel Characteristics:

The mechanical densification of the process engineered fuel into a cylindrical shape creates a thin plastic coating around the outer surface of the fuel cylinder and a pelletized product. The coating ensures a stable fuel that will not breakdown, compost, has no odor and is easy to transport.

Fuel Density:

Fuel density can average 810 pounds/cubic yd for the pelletized product and vary based on heat content requested by customer.

Fuel Moisture Content:

Fuel moisture content can range between 5 and 20%.

Fuel Chlorine Content:

Fuel chlorine content can range between non-detect and 0.3%.

Fuel Sulfur Content:

Fuel sulfur content can range between non-detect and 0.3%.

Fuel Mercury Content:

Fuel mercury content can range between non-detect and 0.3 ppm.

Combustion Characteristics:

From the perspective of the combustion facility, one of the most important attributes of engineered fuel is its homogeneity. The rigorous manufacturing process described herein results in a process engineered fuel product with a highly consistent heating value, moisture content, chemical makeup and composition. This allows the process engineered fuel product to burn evenly and completely with few to no spikes.

A trial burn of process engineered fuel product at a cement manufacturing facility precalciner kiln was performed, and the relative impact of the process engineered fuel product on precalciner combustion characteristics and kiln material product was evaluated. The process engineered fuel product was used to replace petroleum coke fuel in the precalciner. The five-day trial results were positive and indicated similar if not improved combustion characteristics during replacement of petroleum coke. Facility engineers closely watched carbon monoxide (CO) measurements as a means to confirm complete burnout of the fuel. No CO spiking occurred, indicative of consistent combustion, and CO measurements stayed below 100 ppm with oxygen at 5%, indicative of complete combustion.

To further assess the impact of process engineered fuel product on combustion as well as kiln material product, buildup of condensed raw material within the last stage of the precalciner was periodically sampled to assess thermochemical stability. Excessive buildup will typically occur when the thermochemistry between alkalies, sulfur and chlorine (input fuels and raw materials fed to the kiln system) in the precalciner are imbalanced. Such excessive buildup can quickly force a shutdown of the kiln operation and ruin kiln product. One measure of this potential buildup is to measure the composition of the condensed raw material sulfur and/or chlorine content. For the trial burn, the condensed raw material was sampled and analyzed.

During the five-day trial there was no noticeable buildup within the precalciner as seen in conducted thermal imaging and chlorine content in the condensed raw material remained within acceptable levels throughout the test period, even during periods of an elevated feed of the process engineered fuel product of 16 tons per hour.

Based on the sampling and analysis and consistency of the fuel material, the metals content in the process engineered fuel product should remain in the following ranges from Table 1 below, in certain illustrative embodiments:

TABLE 1

| Metals Content (mg/kg) | |
| --- | --- |
| Antimony | 16.9 to 51.5 |
| Arsenic | non-detect to 0.61 |
| Beryllium | non-detect |
| Cadmium | 0.34 to 1.37 |
| Chromium | 10.30 to 20.60 |
| Cobalt | 0.78 to 1.40 |
| Lead | 12.30 to 48.00 |
| Manganese | 34.00 to 48.00 |
| Nickel | 1.72 to 7.25 |
| Selenium | 1.03 to 1.30 |

A contrast between the process engineered fuel product (according to certain illustrative embodiments) and RDF is set forth in Table 2 below:

TABLE 2

Comparison of Process Engineered Fuel Product to RDF

| Process Engineered Fuel Product | RDF |
|---|---|
| Highly Uniform & Consistent Composition<br>The process and system described herein result in a consistent engineered fuel product composed of 99+% fibers and clean plastics. Control of unsuitable fuel materials (e.g., inert, metals, wet organics) or trace contaminants (e.g., chlorine) enhances combustion characteristics and allows engineered fuel product to burn evenly and completely with minimal to no spikes. | Heterogeneous Composition<br>Minimally processed to remove non-combustibles. Whether in pelletized or fluff form, RDF is unable to meet standard of 1% or less contamination by unsuitable fuel materials (e.g., inert, metals, wet organics) or trace contaminants (e.g., chlorine) in fuel mix. |
| Fine-Tuned Heating Content<br>The process and system described herein are designed such that operators can adjust and "fine-tune" the ratio of fibers and clean plastics in the engineered fuel product to within 10% of the customer target value. This ratio correlates directly to heat content and is a parametric measure of the heat content of the engineered fuel product. Btu/pound can be adjusted between 7,500 to11,000, based on customer specifications. | Minimal Processing/No Fine-Tuning of Heating Content<br>Unrefined material, heterogeneous material mix results in uncontrolled combustion, heating and emission spikes. Cannot be fine-tuned to meet customer combustion specifications. Btu/pound can range between 5,500 to 6,500, depending upon contamination by inert and wet organic materials. |
| Well-Controlled Moisture/Ash Content<br>Engineered fuel product is processed to within 5% of the customer target value using control of components and/or heating process. Moisture (wt %) 5-15, Ash (wt %) 2-15 . | Highly Variable Moisture/Ash Content<br>Highly unpredictable Moisture (wt %) 15-35, Ash (wt %) 8-25. Extensive fuel feed system modifications required by end-user. |
| Controlled Chlorine Content<br>The spectroscopic analyzer and sorting system within the process and system described herein allows a user to control the chlorine content of the engineered fuel product to within 0.1% over the course of weekly production. Chlorine content non-detect to 0.3%. | Uncontrolled Chlorine Contamination<br>RDF pellets or fluff generally cannot guarantee chlorine % as there are no controls to identify and reject PVC in processing systems. Chlorine content can range from 0.3% to 2%. |
| Fuel Enhancing Agents<br>The process allows for customized fuel formulations with the addition of fuel enhancing agents such as calcium hydroxide (acid gas scrubbing) or lignin (adjust fuel structure — adjust oxidation rate and improve fuel handling). | No Process Controls to Allow Customization<br>RDF is not manufactured to meet customer's specifications. RDF is minimally processed for disposal in MSW combustion facilities. |
| Clean Burning Fuel Easily Used in Coal-Fired Boilers/Kilns<br>Burns cleaner than solid fossil fuels, MSW and RDF, significantly reducing emissions of criteria pollutants and GHGs. End users need not make significant modifications to fuel feed or combustion units. | Higher Emissions, Requires Extensive System Modification<br>RDF has much higher ash, moisture, chlorine, and sulfur content causing significantly higher emissions than engineered fuel product. Use of RDF requires extensive combustion unit and fuel feed systems. |

The engineered fuel product can be a sustainable fuel replacement for coal, petroleum coke and other traditional solid fuels used to produce steam, electricity or heat. The engineered fuel product can meet precise end-user fuel specifications such as BTU value, biogenic carbon content, and low sulfur content, and can be easily used in coal-fired boilers and kilns. The process for manufacturing the engineered fuel product extracts materials of value from the solid waste stream for recycling and fuel production resulting in significant landfill diversion (up to 65%, in certain illustrative embodiments). The engineered fuel product is a high BTU fuel that burns cleaner than solid fossil fuels, significantly reducing criteria air pollutants and GHG emissions. The engineered fuel product is also a cost-effective compliance tool to meet emissions standards under the Clean Air Act. In certain illustrative embodiments, the process can produce 4-6 tons/hour per production unit. The engineered fuel product can typically be stored in an enclosed, covered storage unit for 1-3 days before being transported to the customer via truck, rail or barge along with the supporting material safety data sheets (MSDS).

It is to be understood that the described subject matter is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

What is claimed is:

1. A process for extracting materials from municipal solid waste, the process comprising the steps of:
   providing a municipal solid waste comprising a first set of waste materials, a second set of waste materials and a third set of waste materials, wherein the first set of waste materials comprises one or more of inert waste and ferrous metals, the second set of waste materials comprises one or more of fibers and rigid plastics, and the third set of waste materials comprises one or more of foam plastics and film plastics;
   shredding the municipal solid waste;
   removing all or substantially all of the first set of waste materials from the municipal solid waste;
   separating the second set of waste materials from the third set of waste materials in the municipal solid waste;
   proportionally recombining the second set of waste materials and the third set of waste materials to form a first recombined stream;
   proportionally mixing a clean stream with the first recombined stream to form a second recombined stream, wherein the clean stream comprises fibers and clean plastics; and
   densifying the second recombined stream.

2. The process of claim 1, wherein the clean stream consists essentially of fibers and clean plastics.

3. The process of claim 1, wherein the clean stream and the first recombined stream each have a biogenic content, and wherein the second recombined stream has a lower biogenic content than the first recombined stream when the clean stream comprises more plastics than clean fibers.

4. The process of claim 1, wherein the clean stream and the first recombined stream each have a heat content, and wherein the second recombined stream has a lower heat content than the first recombined stream when the clean stream comprises more clean fibers than plastics.

5. The process of claim 1, further comprising proportionally mixing a clean stream with the municipal solid waste prior to shredding the municipal solid waste, wherein the clean stream comprises fibers and clean plastics.

6. The process of claim 5, further comprising proportionally mixing a clean stream with the municipal solid waste after shredding the municipal solid waste but before removing the first set of waste materials from the municipal solid waste.

7. The process of claim 1, wherein the second recombined stream is densified to produce an engineered fuel product in pelletized form with a weight density of about 30 pounds/cubic ft.

8. The process of claim 1, wherein the second recombined stream is densified to produce an engineered fuel product in non-pelletized form with a weight density in the range of about 18-25 pounds/cubic ft.

9. The process of claim 7, wherein fibers and clean plastics comprise greater than or equal to about 99 percent by volume of the engineered fuel product.

10. The process of claim 8, wherein fibers and clean plastics comprise greater than or equal to about 99 percent by volume of the engineered fuel product.

11. The process of claim 1, wherein removing substantially all of the first set of waste materials from the municipal solid waste comprises removing at least 25-30% by weight of the municipal waste.

* * * * *